(12) United States Patent
Lucidarme

(10) Patent No.: US 8,402,264 B2
(45) Date of Patent: Mar. 19, 2013

(54) METHOD FOR SECURING AN INTERACTION BETWEEN NODES AND RELATED NODES

(75) Inventor: Thierry Lucidarme, Montigny le Bretonneux (FR)

(73) Assignee: Apple Inc., Cupertino, CA (US)

( * ) Notice: Subject to any disclaimer, the term of this patent is extended or adjusted under 35 U.S.C. 154(b) by 1391 days.

(21) Appl. No.: 11/897,727

(22) Filed: Aug. 31, 2007

(65) Prior Publication Data

US 2008/0059789 A1    Mar. 6, 2008

(30) Foreign Application Priority Data

Aug. 31, 2006  (EP) ..................................... 06291381

(51) Int. Cl.
  *H04L 29/06* (2006.01)
  *G06F 15/16* (2006.01)
  *G06F 15/173* (2006.01)
(52) U.S. Cl. ............. 713/153; 726/3; 709/223; 709/227
(58) Field of Classification Search .................. None
  See application file for complete search history.

(56) References Cited

U.S. PATENT DOCUMENTS

| | | | | |
|---|---|---|---|---|
| 5,784,566 A | * | 7/1998 | Viavant et al. ................. | 709/229 |
| 6,986,061 B1 | * | 1/2006 | Kunzinger ..................... | 713/153 |
| 7,313,234 B2 | * | 12/2007 | Takagaki et al. ................. | 380/28 |
| 7,620,610 B2 | * | 11/2009 | Macbeth et al. ................. | 706/14 |
| 2002/0114469 A1 | * | 8/2002 | Faccin et al. ................... | 380/270 |
| 2003/0035547 A1 | * | 2/2003 | Newton ......................... | 380/279 |
| 2004/0030896 A1 | * | 2/2004 | Sakamura et al. ............. | 713/169 |
| 2004/0059685 A1 | * | 3/2004 | Sakamura et al. ............. | 705/65 |
| 2004/0062400 A1 | * | 4/2004 | Sovio et al. ..................... | 380/286 |
| 2004/0136533 A1 | * | 7/2004 | Takagaki et al. ................ | 380/255 |
| 2005/0256935 A1 | * | 11/2005 | Overstreet et al. ............. | 709/208 |
| 2007/0226358 A1 | * | 9/2007 | Krywaniuk .................... | 709/229 |

FOREIGN PATENT DOCUMENTS

EP    1 416 665    5/2004

OTHER PUBLICATIONS

Ambient Networks, Sixth Framework Programme, IST-2002-507134-AN-WP1-D05, version 1, pp. 1-120 and Annex, pp. 1-157 (Dec. 2005).
A. Menezes et al., "Handbook of Applied Cryptography," Chapter 11, pp. 433-442; 450-451, 454-455; 459-460 (1996).
A. Menezes et al., "Handbook of Applied Cryptography," Chapter 8, pp. 285-287, 292, 294-295 (1996).
A. Menezes et al., "Handbook of Applied Cryptography," Chapter 9, pp. 352 (1996).
J. Hoffstein et al., "NTRU: A Ring-Based Public Key Cryptosystem," Proc. Algorithmic Number Theory, Third Int'l. Symposium (ANTS 3), pp. 267-288 (Jun. 1998).
EP Search Report (EP 06 29 1381) dated Dec. 12, 2006.

* cited by examiner

*Primary Examiner* — Nathan Flynn
*Assistant Examiner* — Trang Doan
(74) *Attorney, Agent, or Firm* — Meyertons, Hood, Kivlin, Kowert & Goetzel, P.C.

(57) ABSTRACT

The invention proposes a method for securing an interaction between a first node and a second node, wherein a security algorithm belonging to both a first set of security algorithms held by the first node and a second set of security algorithms held by a third node is selected to secure the interaction between the first and second nodes, the selection of said security algorithm taking account of capacities of both the first and third nodes.

17 Claims, 7 Drawing Sheets

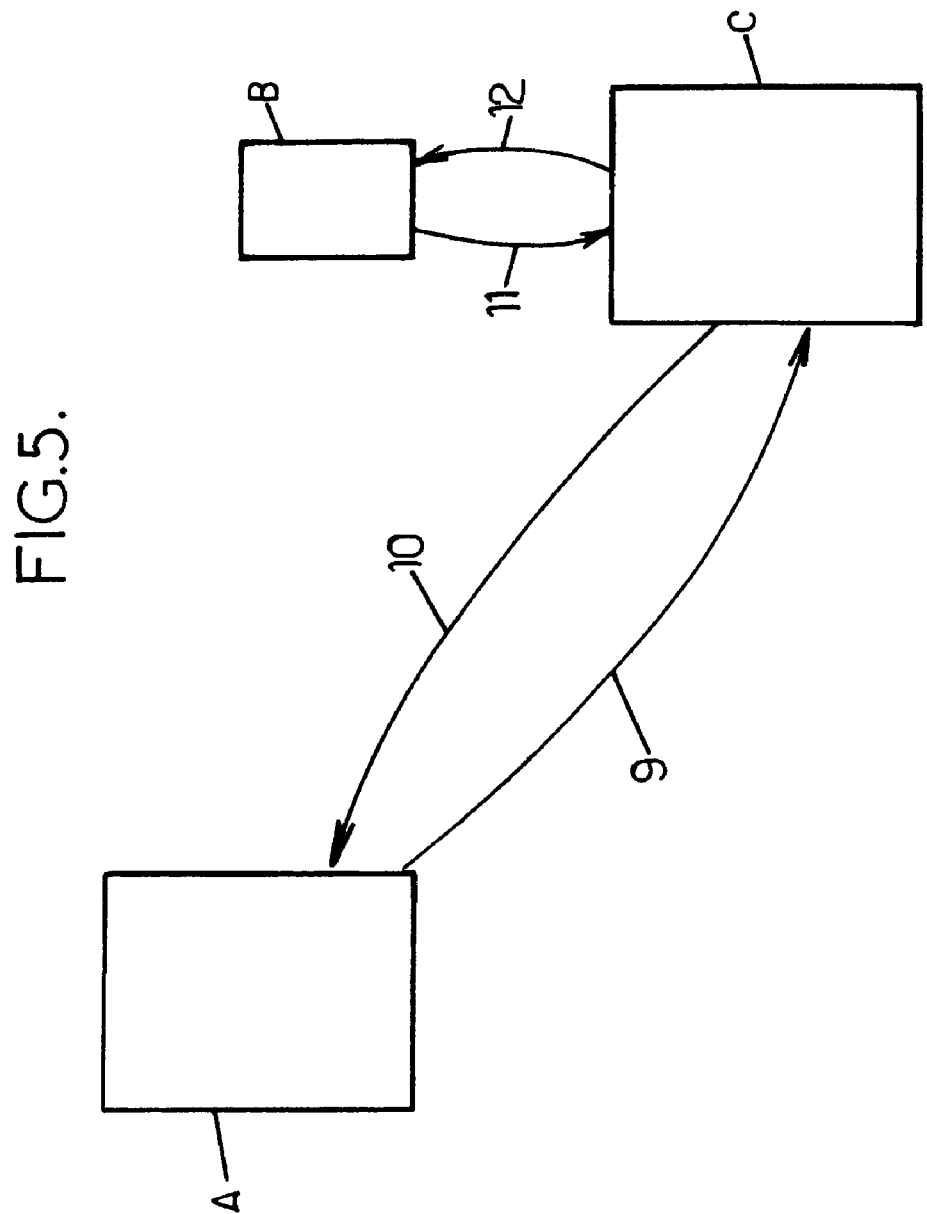

FIG.9.
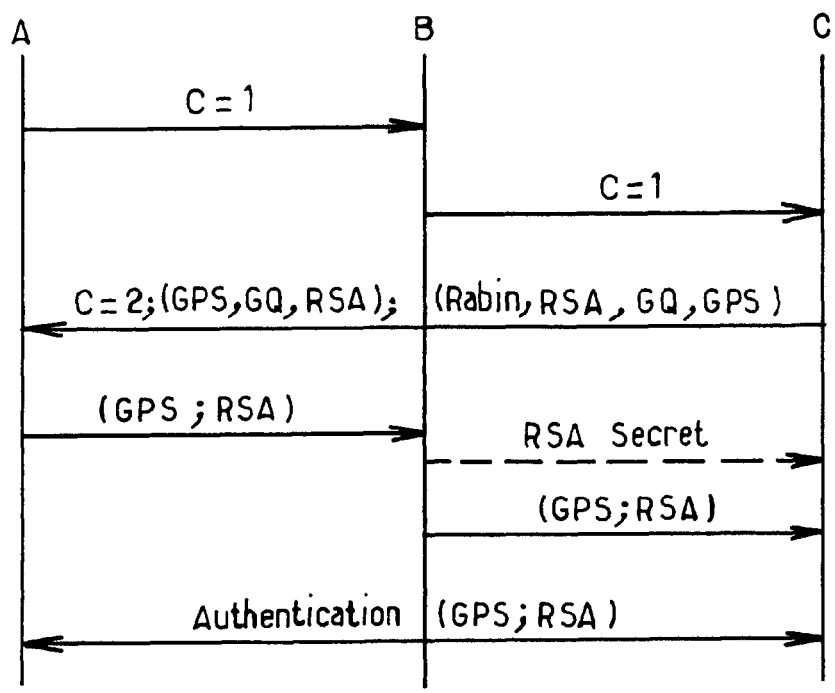
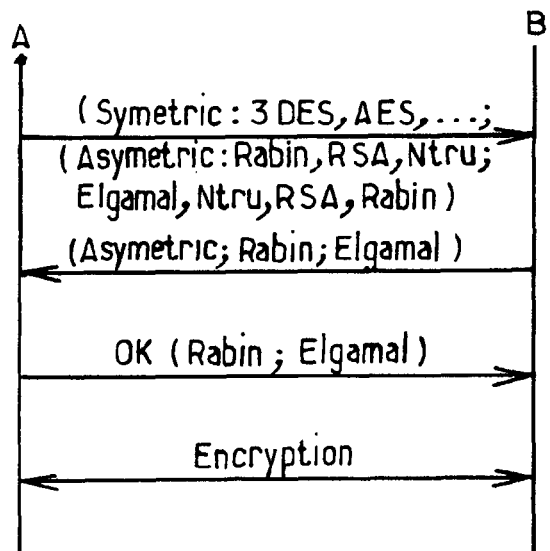
FIG.10.

METHOD FOR SECURING AN INTERACTION BETWEEN NODES AND RELATED NODES

BACKGROUND OF THE INVENTION

The present invention relates to security.

It is classical to secure interactions between nodes by means of security algorithms. In particular, authentication algorithms allow checking whether a node is really the one it claims to be and encryption algorithms help making a transmitted content unclear for anybody else but the node the content is intended to.

However, the nodes in question can be of very different types, since they can comprise e.g. very basic chip cards, RFID (Radio Frequency Identification Chip) tags, simple devices such as mobile phones or PDAs (Personal Digital Assistants), more complex devices such as computer devices, servers, gateways, or even whole telecommunication networks.

It is thus clear that all the nodes do not have the same capacities, especially in terms of processing and/or memory storage.

Therefore, a node having insufficient capacities for carrying out some algorithms may fail in securing its interaction with another node, while some other security algorithms would have suited better and while the other node may have had much higher capacities.

This problem is even more sensitive when speaking of mutual security between nodes. Indeed, mutual security generally carries out a same algorithm for both directions in an interaction. However, each one of the nodes may have sufficient capacities for carrying out security in one direction (e.g. to get authenticated with the other node or to perform encryption), but insufficient capacities for carrying out security in the other direction (e.g. to authenticate the other node or to perform decryption).

An object of the present invention is to alleviate the above mentioned drawbacks.

SUMMARY OF THE INVENTION

The invention proposes a method for securing an interaction between a first node and a second node. According to the method, a security algorithm belonging to both a first set of security algorithms held by the first node and a second set of security algorithms held by a third node is selected to secure the interaction between the first and second nodes, the selection of said security algorithm taking account of capacities of both the first and third nodes.

Because the capacities of both the first and third nodes are taken into account to select an appropriate security algorithm, this selection can be seen as joint. This is in contrast with prior art methods in which security algorithms were selected by only one of the parties involved, generally without any consideration for capacities.

The security algorithms can comprise authentication and/or encryption algorithms.

The capacities taken into account for the selection of a security algorithm can comprise processing and/or memory storage capacities. In this case, the selection of a security algorithm is advantageously such that said security algorithm requires substantially less processing and/or storage from the one of the first and third nodes which has the lowest processing and/or memory storage capacities than from the other.

The selection of a security algorithm can relate to any of several protocol layers.

A respective security algorithm can possibly be selected to secure the interaction between the first and second nodes in each direction. Alternatively, only one direction could be secured.

In a simple case, the second node and the third node could refer to the same node. When delegation is used, the third node could be a node, different from the second node, to which processing and/or storage is delegated from the second node.

The invention also proposes a system for implementing the above mentioned method. The system comprises:
a first node holding a first set of security algorithms, a second node and a third node holding a second set of security algorithms; and
means for selecting a security algorithm belonging to both the first and second sets of security algorithms to secure the interaction between the first and second nodes, said means taking account of capacities of both the first and third nodes.

The invention further proposes a node arranged for interacting with a first other node in a secured manner, said node comprising:
memory means for holding a set of security algorithms;
means for receiving an indication of capacities of a second other node;
means for selecting at least one security algorithm belonging to said set of security algorithms to secure an interaction between said node and the first other node, said means taking account of said indication of capacities of the second other node as well as of capacities of said node.

The invention also proposes a node arranged for interacting with another node in a secured manner, said node comprising:
memory means for holding a set of security algorithms;
means for transmitting an indication of capacities of said node to the other node;
means for receiving an indication of security algorithms from the other node;
means for selecting one of the security algorithms indicated to the reception means to secure an interaction between said node and the other node, so that said one of the security algorithms belongs to said set of security algorithms.

The invention further proposes a computer program product comprising code instructions for implementing at least part of the above mentioned method, when loaded and run on a node.

The preferred features of the above aspects which are indicated by the dependent claims may be combined as appropriate, and may be combined with any of the above aspects of the invention, as would be apparent to a person skilled in the art.

BRIEF DESCRIPTION OF THE DRAWINGS

FIG. 5 is a schematic view of a system in which one node makes use of delegation;

FIG. 8-9 show examples of messages exchanged between nodes for authentication purposes in case of delegation;

FIG. 10 shows an example of messages exchanged between nodes for encryption purposes.

DESCRIPTION OF PREFERRED EMBODIMENTS

Figure 1:
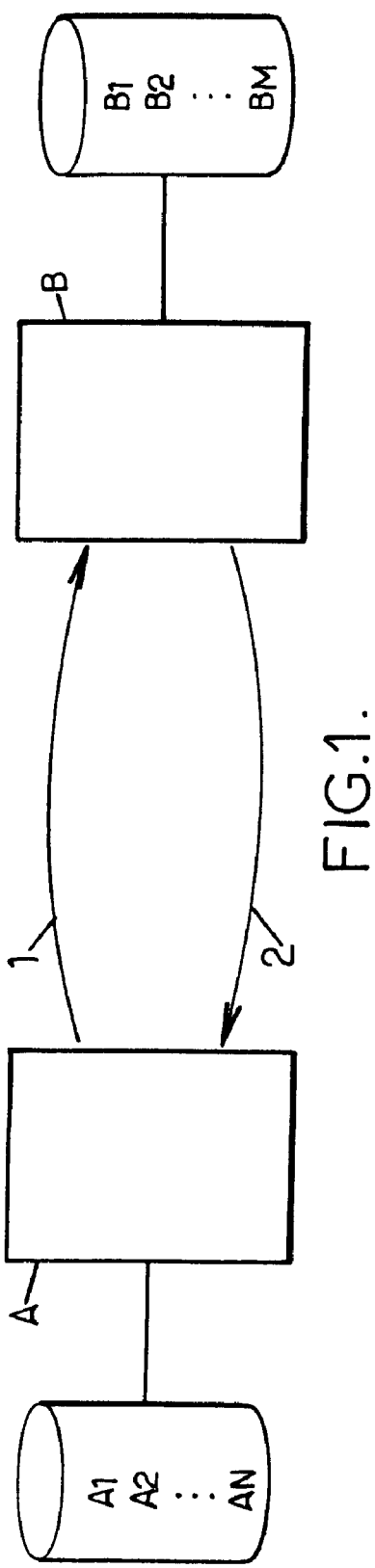
FIG. 1 is a schematic view of a basic system capable of implementing the invention.

FIG. 1 shows two nodes A and B that can be of various types, such as chip cards, RFID tags, mobile phones, PDAs, computer devices, servers, gateways, telecommunication networks, etc. A and B can be of the same type or of different types.

As an example, A and B can be access points of an Ambient Network as defined is the so-called integrated project within the European Union. This project has developed a new networking concept that embraces a very wide range of user scenarios, and accommodates a diverse set of current and innovative solutions. It gives rise to standardization. For example, the document IST-2002-507134-AN-WP1-D05, version 1.0, published in December 2005, describes the AN ("Ambient Networks") framework architecture.

Of course, A and B could be other nodes, such as nodes of a Daidalos network for instance.

The nodes A and B each hold a set of security algorithms that can be used to secure an interaction therebetween, such as a communication. As illustrated in FIG. 1, A stores the security algorithms A1, A2, . . . , AN in an associated memory, while B stores the security algorithms B1, B2, . . . , BM in an associated memory. Said memories can be internal or external. Some of the algorithms A1, A2, . . . , AN may be identical to some of the algorithms B1, B2, . . . , BM. But, some others may be present only in A's or B's memory.

Advantageously, some of A1, A2, . . . , AN and B1, B2, . . . , BM comprise authentication algorithms, examples of which will be described later. Still advantageously, some of A1, A2, . . . , AN and B1, B2, . . . , BM comprise encryption algorithms, examples of which will be described later.

A1, A2, . . . , AN and B1, B2, . . . , BM may not all require the same capacities of each party involved in an interaction (i.e. A on the one hand and B on the other hand).

According to the invention, one of the above mentioned security algorithms belonging to both sets A1, A2, . . . , AN and B1, B2, . . . , BM is selected to secure an interaction between A and B and this selection takes account of capacities of both A and B.

As an example, A1=B3 may be selected for an interaction between A and B in the direction from A to B (arrow 1) and A2=BM may be selected for an interaction between A and B in the direction from B to A (arrow 2), based on capacities of both A and B. Of course, the same algorithm could suit for both directions in some cases. Moreover, it can happen that an interaction is to be secured in one direction only.

Capacities of the nodes in question may include processing capacities and/or memory storage capacities for instance.

Since the capacities of both parties involved are taken into account to secure an interaction between A and B, the security algorithm selection is thus joint between said parties.

Different situations are further exemplified herein after. Of course, the security algorithms cited below are only examples and other security algorithms may be suitable as well.

Figure 2:
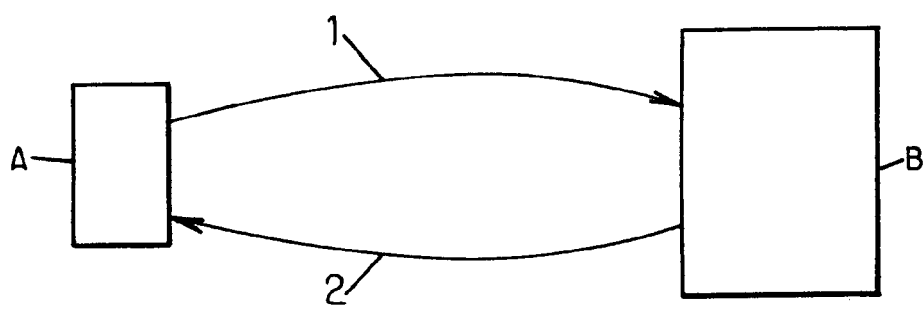
FIG. 2 is a schematic view of an asymmetric system in which the invention can apply.

In the example illustrated in FIG. 2, the node A has lower processing capacities than the node B (the size of the nodes is drawn accordingly). For example, A is a PDA, while B is a computer. The security algorithm selected to secure an interaction between A and B is thus advantageously such that it requires substantially less processing from A than from B.

Likewise, it should be noted that if A had lower memory storage capacity than B, the security algorithm selected to secure an interaction between A and B could advantageously be such that it requires substantially less storage from A than from B.

When speaking of authentication, the security algorithm selected to secure an interaction between A and B in the direction from A to B (arrow 1), i.e. for B to authenticate A, could be one of the well known authentication algorithms ElGamal, Schnorr or GPS for instance, since they require few computation from the prover (A) but more from the verifier (B).

As an illustration, it is reminded that ElGamal operates in the following way, for an authentication of A with B (i.e. when B authenticates A). A holds a private key a. Both A and B hold a public key (y,p,g), where $y=g^a \mod p$. A, who is the prover, generates a signature (r,s) for a message M, where $r=gk \mod p$, k is random secret integer, $1 \leq k \leq p-2$, and $$s = \frac{M - ar}{k} \mod (p-1).$$

A transmits r and s to B. B, as the verifier, checks A's signature (r,s) on M. B thus computes $g^M \mod p$ and $y^r r^s \mod p$. If both values are identical, A is authenticated successfully.

From this, it is clear that ElGamal requires more computation from the verifier B than from the prover A.

Further detail about ElGamal in authentication can be found in the "Handbook of Applied Cryptography", by A. Menezes, P. van Oorschot, and S. Vanstone, CRC Press, 1996, Chapter 11, pages 454-455. Likewise, Schnorr is fully described in the "Handbook of Applied Cryptography", pages 459-460.

In a similar way, the security algorithm selected to secure an interaction between A and B in the direction from B to A (arrow 2) by authentication, i.e. for A to authenticate B, could be Rabin or RSA for instance.

It is reminded that Rabin operates in the following way, for an authentication of B with A (i.e. when A authenticates B). B holds a private key (p,q), p and q being two large distinct random primes. Both A and B hold a public key n=pq. In other words, only B knows the factorization of n. B, who is the prover in this case, generates a signature s which is a modular square root of a message m. B transmits s to A. A, as the verifier, checks B's signature s on m, by computing $s^2 \mod n$. If $s^2 \mod n$ equals m, B is authenticated successfully.

It is thus clear that Rabin requires substantially more computation from the prover B than from the verifier A, since A substantially has only a modular square to calculate, while B must compute a modular square root which is a much more complex operation.

Further detail about Rabin in authentication can be found in the "Handbook of Applied Cryptography", by A. Menezes, P. van Oorschot, and S. Vanstone, CRC Press, 1996, Chapter 11, pages 438-442.

Likewise, RSA operates as follows, for an authentication of B with A. B holds a private key d, such that $ed=1 \mod f$, where e is a random integer (e.g. e=3), $f=(p-1)(q-1)$ and p and q are two large distinct random primes. Both A and B hold a public key (n,e), where n=pq. B, who is the prover in this case, generates a signature $s=m^d \mod n$ of a message m. B transmits s to A. A, as the verifier, checks B's signature s on m, by computing $s^e \mod n$. If $s^e \mod n$ equals m, B is authenticated successfully.

Here again, it is clear that RSA requires substantially more computation from the prover B than from the verifier A.

Further detail about RSA in authentication can be found in the "Handbook of Applied Cryptography", by A. Menezes, P. van Oorschot, and S. Vanstone, CRC Press, 1996, Chapter 11, pages 435-438.

The interaction between A and B may be secured in one direction only. But it could be secured in both directions as well, by using the respective above mentioned algorithms. This situation relates to a mutual authentication case.

When speaking of encryption, the security algorithm selected to secure an interaction between A and B in the direction from A to B (arrow 1) by encryption, i.e. to encrypt traffic and/or signaling transmitted from A to B, could be one of the well known encryption algorithms Rabin or RSA for instance, since they require few computation from the encrypter (A) but more from the decrypter (B).

As an illustration, it is reminded that Rabin operates as follows, for encryption by A and decryption by B. B holds a private key (p,q), p and q being two large distinct random primes. Both A and B hold a public key n=pq. In other words, only B knows the factorization of n. A encrypts a message m by computing $c=m^2$ mod n. A transmits the ciphertext c to B. B must calculate a modular square root of c, in order to recover m. This is possible due to the fact that B knows the factorization of n.

From this, it is clear that Rabin requires substantially more computation from the decrypter B than from the encrypter A, since A only calculates a modular square, by contrast with a modular square root for B.

Further detail about Rabin in encryption can be found in the "Handbook of Applied Cryptography", by A. Menezes, P. van Oorschot, and S. Vanstone, CRC Press, 1996, Chapter 8, page 292.

Likewise, RSA operates as follows, for encryption by A and decryption by B. B holds a private key d, such that ed=1 mod f, where e is a random integer (e.g. e=3), f=(p−1)(q−1) and p and q are two large distinct random primes. Both A and B hold a public key (n,e), where n=pq. A encrypts a message m by computing $c=m^e$ mod n. A transmits the ciphertext c to B. B must calculate $c^d$ mod n, in order to recover m.

From this, it is clear that RSA requires substantially more computation from the decrypter B than from the encrypter A.

Further detail about RSA in encryption can be found in the "Handbook of Applied Cryptography", by A. Menezes, P. van Oorschot, and S. Vanstone, CRC Press, 1996, Chapter 8, pages 285-287.

In a similar way, the security algorithm selected to secure an interaction between A and B in the direction from B to A (arrow 2) by encryption, i.e. to encrypt traffic and/or signaling transmitted from B to A, by encryption could be ElGamal for instance.

It is reminded that ElGamal operates as follows, for encryption by B and decryption by A.

A holds a private key a. Both A and B hold a public key $(g^a,p,g)$, where $g^a$ mod p. B encrypts a message m by computing $x=g^k$ mod p and $d=m.(g^a)^k$ mod p, where k is random secret integer, $1 \leq k \leq p-2$. B transmits the ciphertext c=(x,d) to A. A must calculate $x^{-a}$ d mod p, in order to recover m.

From this, it is clear that ElGamal requires substantially more computation from the encrypter B than from the decrypter A.

Further detail about ElGamal in encryption can be found in the "Handbook of Applied Cryptography", by A. Menezes, P. van Oorschot, and S. Vanstone, CRC Press, 1996, Chapter 8, pages 294-295.

The interaction between A and B may be secured in one direction only. But it could be secured in both directions as well, by using the respective above mentioned algorithms. This situation relates to a mutual encryption/decryption case.

Figure 3:
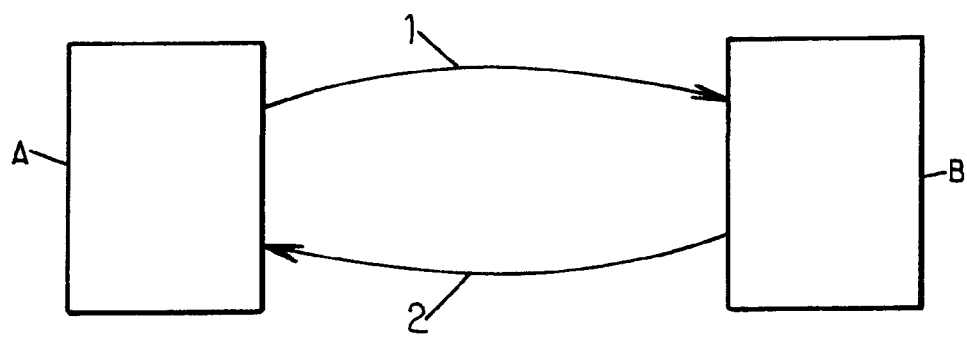
FIG. 3 is a schematic view of a symmetric system in which the invention can apply.

In the example illustrated in FIG. 3, the nodes A and B have substantially the same processing capacities (the size of the nodes is drawn accordingly). For example, A and B both are computers. The security algorithm selected to secure an interaction between A and B is thus advantageously such that it requires substantially as much processing from A as from B.

Likewise, it should be noted that if A and B had the same memory storage capacity, the security algorithm selected to secure an interaction between A and B could advantageously be such that it requires substantially as much storage from A as from B.

When speaking of authentication, the security algorithm selected to secure an interaction between A and B in the direction from A to B (arrow 1), i.e. for B to authenticate A, could be the well known authentication algorithm GQ (for Guillou-Quisquater) for instance, since it requires substantially as much computation from the prover (A) as from the verifier (B).

Further detail about GQ in encryption can be found in the "Handbook of Applied Cryptography", by A. Menezes, P. van Oorschot, and S. Vanstone, CRC Press, 1996, Chapter 11, pages 450.

The same applies for the authentication algorithm selected to secure an interaction between A and B in the direction from B to A (arrow 2), due to symmetry between the nodes in this case.

The interaction between A and B may be secured in one direction only. But it could be secured in both directions as well. This situation relates to a mutual authentication case.

When speaking of encryption, the security algorithm selected to secure an interaction between A and B in the direction from A to B (arrow 1) by encryption, i.e. to encrypt traffic and/or signaling transmitted from A to B, could be one of the well known encryption algorithms Ntru, GGH and McEliece for instance, since they require substantially as much computation from the encrypter (A) as from the decrypter (B).

As an illustration, further detail about Ntru can be found for instance in an article by J. Hoffstein, J. Pipher and J. H. Silverman called "NTRU: a ring-based public key cryptosystem", Proc. Algorithmic Number Theory, Third Int'l Symp. (ANTS 3), J P Buhler, ed. pp. 267-288, June 1998.

The same applies for the encryption algorithm selected to secure an interaction between A and B in the direction from B to A (arrow 2), due to symmetry between the nodes in this case.

The interaction between A and B may be secured in one direction only. But it could be secured in both directions as well. This situation relates to a mutual encryption/decryption case.

Figure 4:
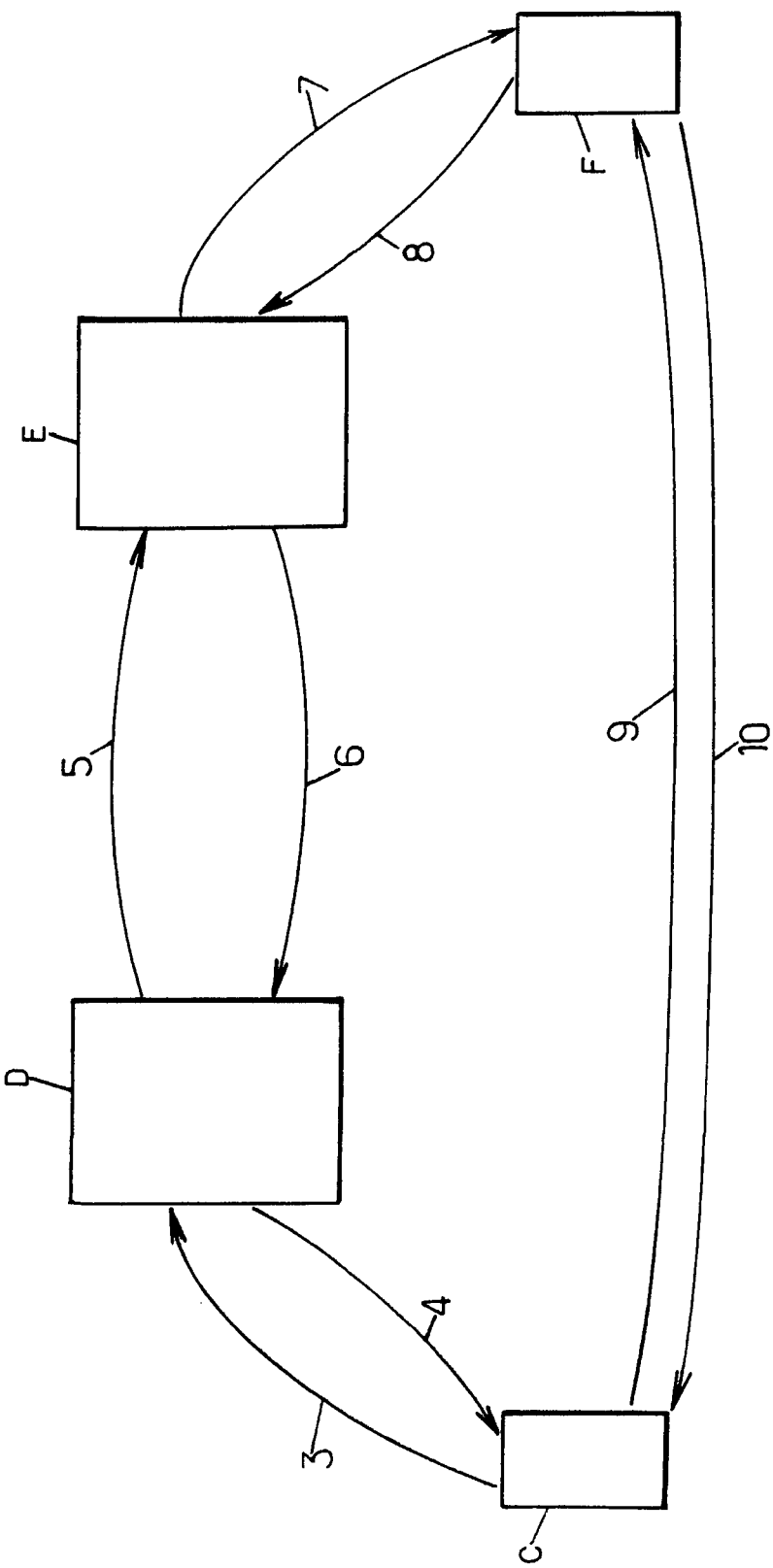
FIG. 4 is a schematic view of a more complex system in which the invention can apply.

FIG. 4 shows an example involving four nodes C-F. C and F have lower processing capacities than D and E. Several interactions are to be secured in this example. For instance, interactions between C and D, D and E, and E and F must give rise to security, each in one or both directions (see arrows 3-7). Said security can be peer-to-peer authentication in a low protocol layer for instance, such as a SIM-based level.

Another interaction may be secured afterwards between C and D at a higher level, such as an end-to-end authentication in an applicative layer (see arrows 9-10).

Of course, authentication and/or encryption could also be performed between some of the nodes in any other protocol layers.

Like for the previous examples, the following authentication algorithms could be selected with respect to the different interactions to be secured: ElGamal, Schnorr or GPS for authentication of C by D (arrow 3) and of F by E (arrow 8), Rabin or RSA for authentication of D by C (arrow 4) and of E by F (arrow 7), GQ for authentication of D by E (arrow 5), of E by D (arrow 6), of C by F (arrow 9) and of F by C (arrow 10).

If encryption must be used for the interactions between the nodes of FIG. 4, the following encryption algorithms could be selected: Rabin or RSA for encryption from C to D (arrow 3) and from F to E (arrow 8), ElGamal for encryption from D to C (arrow 4) and from E to F (arrow 7), Ntru for encryption from D to E (arrow 5), from E to D (arrow 6), from C to F (arrow 9) and from F to C (arrow 10).

FIG. 5 shows another mode of operation of the present invention, in which an interaction between two nodes A and B must be secured and in which B delegates processing to another node C. In this example, C has similar processing capacities as A, but higher capacities than B. It should be noted that, in another example, B could delegate storage to C in addition to or instead of processing.

C can thus authenticate A by using an authentication algorithm that requires substantially as much processing from A as from C. For instance, GQ could be selected as an appropriate authentication algorithm (arrow 9).

In the reverse direction (arrow 10), GQ could suit as well provided that C has received B's private key before. To achieve this, a mutual authentication could be performed beforehand between B and C, so as to ensure that the interaction between B and C is secured. Due to the different processing capacities of B and C, ElGamal, Schnorr or GPS could be selected for authentication of B by D (arrow 11), while Rabin or RSA could be selected for authentication of D by B (arrow 12). Encryption may also be performed between B and C in addition to or instead of authentication. Once the interaction between B and C is considered secured, B can transmit its private key to C, to make the latter in a position to authenticate with A.

If C does not know B's private key, B could perform an authentication with A by itself. In this case, only processing for achieving authentication of A with B is delegated to C (arrow 9).

B may also transmit its public key to C. This public key can be signed in a certificate by a trusted third party and can be checked by C which may also verify that B holds the associated secret key (by sending a random for instance).

Another way would be to use a keyed hash function e.g. MAC-k, and to apply it to B's public key, before sending the result of this operation to C. Any secret predefined number shared by B and C can be used as a symmetric key k for said keyed hash function. The function HMAC-SHA-96 is an example of such keyed hash function. Further detail about keyed hash functions can be found e.g. in the "Handbook of Applied Cryptography", by A. Menezes, P. van Oorschot, and S. Vanstone, CRC Press, 1996, Chapter 9, pages 352. These functions ensure the authenticity of the hashed message.

As to encryption, Ntru could be selected for encryption in both directions between A and C so as to secure the interaction between A and B.

If C does not know B's private key, it cannot decrypt anything from A. In this case, decryption should be performed by B itself. However, C can still encrypt information to be sent to A (arrow 10).

C may also receive B's private key from B beforehand, so as to be able to decrypt information received from A (arrow 9). To achieve this, the interaction between B and C should preferably be secured in authentication and/or encryption beforehand.

Here again, B may also transmit its public key to C, e.g. by use of a keyed hash function such as MAC-k' (with k' different from k).

FIG. 6-10 show examples of messages exchanged between nodes in accordance with the principles described above.

Figure 6:
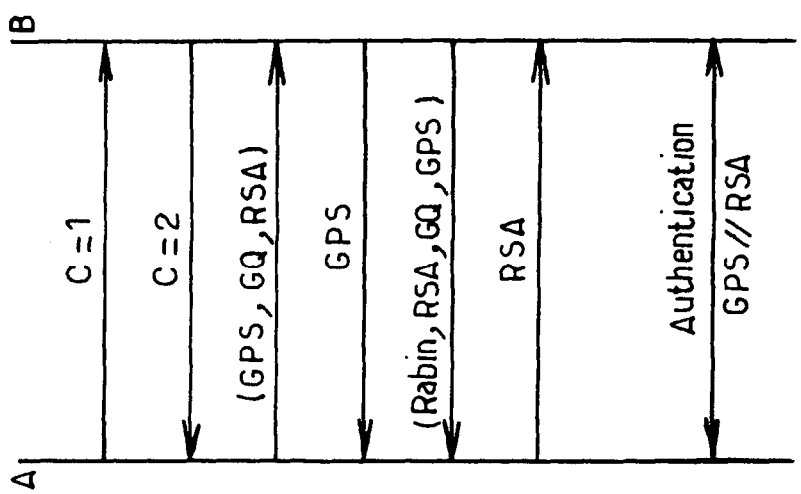

FIG. 6 relates to a selection of an authentication algorithm for each direction between nodes A and B. A and B first exchange indications about their capacities. As an example, the indication of processing capacities C for each node are coded in the following manner: the value 1 corresponds to low processing capacities, the value 2 corresponds to medium processing capacities and the value 3 corresponds to high processing capacities. In the illustrated example, A thus transmits to B the indication C=1, while B transmits to A the indication C=2. Of course, other types of capacities indications may be used, such as a relatively precise estimate of said capacities.

When receiving the indication C=2, A deduces that B holds higher processing capacities and thus proposes authentication algorithms among the set of authentication algorithms it holds for being authenticated, some of which comprising authentication algorithms which require substantially more processing from B than from A. The proposed authentication algorithms can be identified by indications sent to B, such as names of said algorithms. The indications are presented in the form of a list for instance. This list is advantageously ranked in decreasing order of preference from A's point of view.

In the illustrated example, the list is composed of (GPS, GQ, RSA). GPS which requires substantially more processing from B than from A is in the first place, before GQ which requires substantially similar processing from A and B and RSA which requires substantially more processing from A than from B.

On reception, B can select an authentication algorithm of the list, which is also supported by B, i.e. that also belongs to the set of authentication algorithms hold by B. In the example of FIG. 6, GPS is selected.

Then, B transmits to A an indication of the authentication algorithms it supports for being authenticated, and which match with the capacities of both nodes. Advantageously, a list identifying said authentication algorithms ranked in order of preference from B's point of view is sent to A. In the illustrated example, the list is composed of (Rabin, RSA, GQ, GPS).

On reception, A can select an authentication algorithm of the list, which also belongs to the set of authentication algorithms hold by A. In the example of FIG. 6, RSA is selected. This may be because A does not support Rabin for instance.

Then, mutual authentication can take place between A and B for securing the interaction therebetween. This authentication uses GPS for authenticating A with B and RSA for authenticating B with A.

Figure 7:
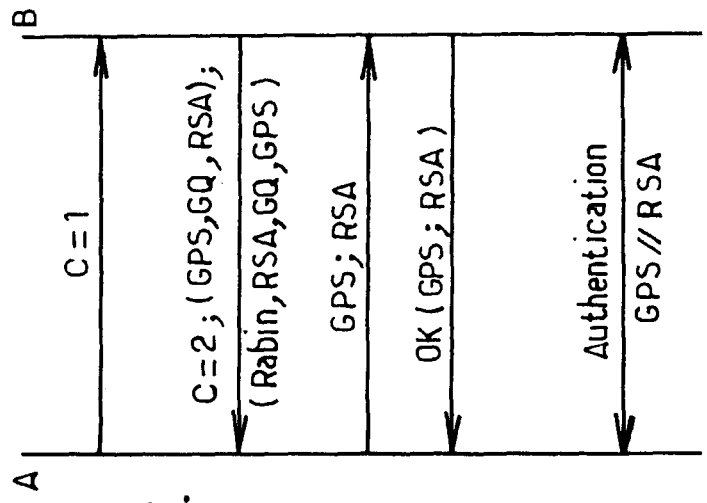
FIG. 6-7 show examples of messages exchanged between nodes for authentication purposes.

FIG. 7 shows a variant of FIG. 6 in which the same information are exchanged between A and B but by use of fewer messages. In particular, B sends in the same message an indication of its capacities as well as a list of authentication algorithms for authenticating A and a list of authentication algorithms for being authenticated with A, all said authentication algorithms belonging to the set of algorithms hold by B and taking account of the capacities of both A and B.

On reception, A can select an algorithm for each direction if needed and inform B about its selection. B can then confirm the selection, before the mutual authentication takes place.

It can be noted that the exchanges of FIG. 7 require only four messages, while the ones of FIG. 6 require six messages. This leads to a reduction of signaling.

Figure 8:
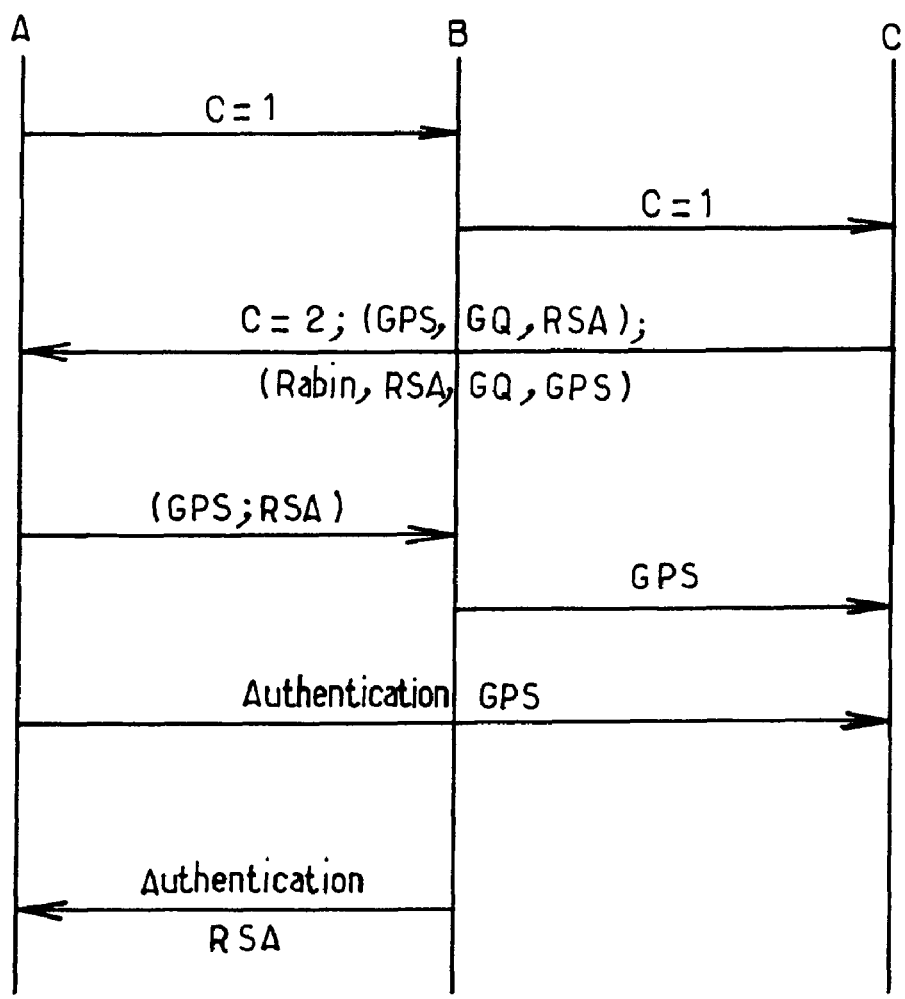

FIG. 8 shows examples of messages exchanged in a delegation situation. In this case, B delegates its processing to C.

A sends an indication of its processing capacities (C=1). This indication is relayed to C by B. C then responds with a message identifying its own processing capacities (C=2), authentication algorithms for authenticating A and authentication algorithms for authenticating B with A, all said authentication algorithms belonging to the set of algorithms hold by C and taking account of the capacities of both A and C.

A sends an indication of the algorithms it has selected among the ones proposed by C (GPS and RSA for each direction respectively). On reception of this indication, B informs its delegate C that GPS has been selected for authenticating A. C can then authenticate A by using GPS.

A authenticates B by use of RSA. The related processing is performed by B directly, and not by C for this direction. This is a partial delegation case. It may be due to the fact that B did not provide C with its private key.

By contrast, in the example illustrated in FIG. 9, B's private key serving as RSA secret is sent from B to C. This allows C further authenticating B with A by using RSA. Here, all processing relating to mutual authentication with A is performed by C, which is a total delegation case.

FIG. 10 shows examples of messages exchanged between the nodes A and B with respect to encryption. These messages may follow the messages used for authentication as described with reference to FIG. 6 or FIG. 7. Combined messages for both authentication and encryption could also be envisaged.

In the example of FIG. 10, A sends B an indication of the encryption algorithms it holds for each direction. The indication can comprise lists of encryption algorithms. In the lists, symmetric (3DES, AES, etc.) and asymmetric (Rabin, RSA, Ntru, ElGamal, etc.) algorithms can be separated. It is reminded that symmetric algorithms make use of a secret key shared between both parties involved, while in the asymmetric algorithms, encryption uses a public key and decryption uses a private key. Symmetric algorithms usually present a limited complexity and thus lead to a quick encryption/decryption. Asymmetric algorithms, on the other hand, do not require prior and regular secret key exchanges between both parties involved, which alleviates burdening of the system.

The choice, by B, of a symmetric or asymmetric algorithm could also be done beforehand.

In the example illustrated in FIG. 10, B selects Rabin and ElGamal for encryption by A and B respectively. This selection takes account of the capacities of both nodes A and B.

Finally, encryption can be carried out in both directions, so as to secure the interaction between A and B.

Some or all the operations described above can be carried out by virtue of a computer program run and loaded on one or both the nodes involved.

We claim:

1. A method for securing an interaction between a first node and a second node, wherein a security algorithm belonging to both a first set of security algorithms held by the first node and a second set of security algorithms held by a third node is selected by a selector comprised in at least one of the nodes to secure the interaction between the first and second nodes, the selection of said security algorithm taking account of capacities of both the first and third nodes, wherein the selection of said security algorithm takes account of memory storage capacities of both the first and third nodes, wherein the selection of said security algorithm is such that said security algorithm requires less storage from the one of the first and third nodes which has the lowest memory storage capacities than from the other.

2. A method as claimed in claim 1, wherein the security algorithms belonging to the first and second sets of security algorithms comprise authentication algorithms.

3. A method as claimed in claim 1, wherein the security algorithms belonging to the first and second sets of security algorithms comprise encryption algorithms.

4. A method as claimed in claim 1, wherein the selection of said security algorithm takes account of processing capacities of both the first and third nodes.

5. A method as claimed in claim 4, wherein the selection of said security algorithm is such that said security algorithm requires less processing from the one of the first and third nodes which has the lowest processing capacities than from the other.

6. A method as claimed in claim 1, wherein said security algorithm is selected to secure the interaction between the first and second nodes in any of several protocol layers.

7. A method as claimed in claim 1, wherein a respective security algorithm is selected to secure the interaction between the first and second nodes in each direction.

8. A method as claimed in claim 1, wherein the second node and the third node refer to the same node.

9. A method as claimed in claim 1, wherein the third node is a node to which processing and/or storage is delegated from the second node.

10. The method of claim 1, wherein an indication of capacities of the first node is transmitted to the third node before said security algorithm is selected.

11. A method as claimed in claim 10, wherein, after having received the indication of capacities of the first node, the third node transmits to the first node an indication of at least one security algorithm to secure the interaction between the first and second nodes, said at least one security algorithm being chosen from the second set of security algorithms so as to suit said indication of capacities of the first node as well as capacities of the third node.

12. A method as claimed in claim 11, wherein the indication of security algorithms transmitted to the first node is set to show an order of preference of the security algorithms from the point of view of the third node.

13. A method as claimed in claim 11, wherein the first node then transmits to the third node an indication of one of the security algorithms indicated by the third node to secure the interaction between the first and second nodes, said one of the security algorithms belonging to the first set of security algorithms.

14. A method as claimed in claim 11, wherein said at least one security algorithm indicated by the third node consists of one security algorithm selected from security algorithms belonging to the first set of security algorithms and previously indicated by the first node to the third node.

15. A method for securing an interaction between a first node and a second node, comprising:
selecting a security algorithm belonging to both a first set of security algorithms held by the first node and a second set of security algorithms held by a third node by at least one of the nodes to secure the interaction between the first and second nodes, the selection of said security algorithm taking account of capacities of both the first and third nodes, wherein the selection of said security algorithm takes account of memory storage capacities of both the first and third nodes, wherein the selection of said security algorithm is such that said security algorithm requires less storage from the one of the first and third nodes which has the lowest memory storage capacities than from the other.

16. A non-transitory, computer accessible memory medium storing program instructions for securing an interaction between a first node and a second node, wherein the program instructions are executable by a processor to:

select a security algorithm belonging to both a first set of security algorithms held by the first node and a second set of security algorithms held by a third node to secure the interaction between the first and second nodes, the selection of said security algorithm taking account of capacities of both the first and third nodes, wherein the selection of said security algorithm takes account of memory storage capacities of both the first and third nodes, wherein the selection of said security algorithm is such that said security algorithm requires less storage from the one of the first and third nodes which has the lowest memory storage capacities than from the other.

17. A first node, configured to secure an interaction between a second node and a third node, comprising:

a memory medium storing a first set of security algorithms;
a transceiver for performing communication with one or more other nodes; and
processing hardware coupled to the transceiver and the memory medium, wherein the processing hardware is configured to select a security algorithm belonging to both the first set of security algorithms held by the first node and a second set of security algorithms held by the second node to secure the interaction between the second and third nodes, the selection of said security algorithm taking account of capacities of both the first and second nodes, wherein the selection of said security algorithm takes account of memory storage capacities of both the first and second nodes, wherein the selection of said security algorithm is such that said security algorithm requires less storage from the one of the first and second nodes which has the lowest memory storage capacities than from the other.

* * * * *